T. J. DAWSON.
HOG CATCHER AND HOLDER.
APPLICATION FILED JULY 6, 1916.
1,236,549.
Patented Aug. 14, 1917.
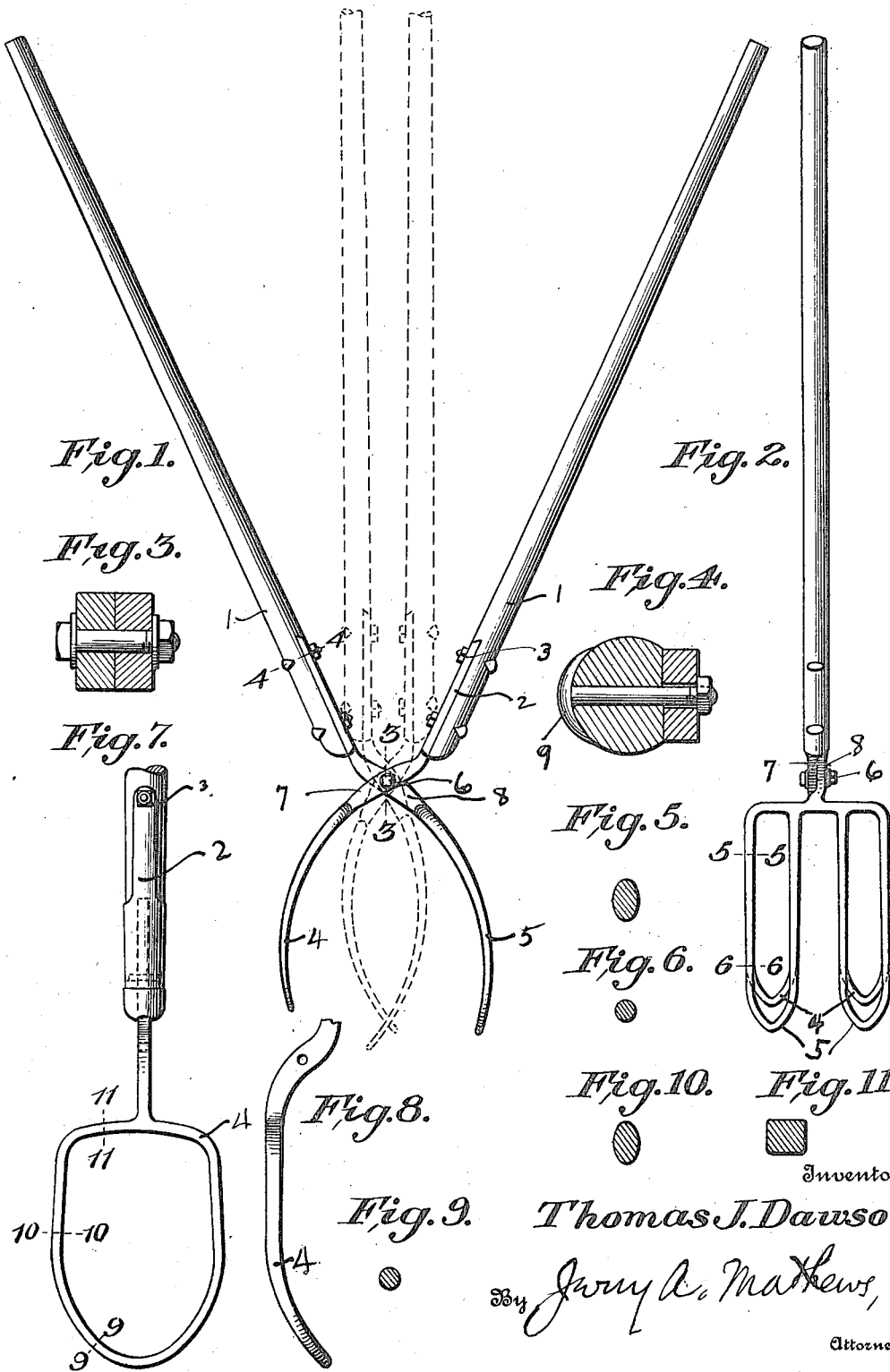
Inventor
Thomas J. Dawson,
By Jerry A. Mathews,
Attorney

UNITED STATES PATENT OFFICE.

THOMAS J. DAWSON, OF CLARKSVILLE, MISSOURI.

HOG CATCHER AND HOLDER.

1,236,549.   Specification of Letters Patent.   Patented Aug. 14, 1917.

Application filed July 6, 1916.   Serial No. 107,840½.

*To all whom it may concern:*

Be it known that I, THOMAS J. DAWSON, a citizen of the United States, and resident of Clarksville, in the county of Pike and State of Missouri, have invented a new and useful Hog Catcher and Holder, of which the following is a specification.

The object of my invention is to provide a convenient, inexpensive, light but strong device for readily catching and holding hogs of various sizes, or other animals, while ringing, altering, marking or vaccinating. It is an especial object of my invention to provide novel opposed blade fingers of unlike length so that the members on one side may pass through the corresponding members on the other side as the device is moved to closed position to permit of using the instrument upon animals varying greatly in size. It is further my object to provide improved means for mounting and securing the elements of the device together, as set forth in the accompanying drawings.

I attain the objects of my invention by the mechanism illustrated in the accompanying drawings, in which—

Figure 1 is a side elevation of the device, its appearance when moved to closed position being shown in dotted lines; Fig. 2 is a view of the face of the blade fingers; Fig. 3 is a section on line 3—3 of Fig. 1; Fig. 4 is a section on line 4—4 of Fig. 1; Fig. 5 is a section on line 5—5 of Fig. 2; Fig. 6 is a section on line 6—6 of Fig. 2; Fig. 7 is a face view of Fig. 8, there being a single blade finger on each side; Fig. 8 is a detail of a finger blade of slightly modified shape; Fig. 9 is a section on line 9—9 of Fig. 7; Fig. 10 is a section on line 10—10 of Fig. 7; and Fig. 11 is a section on line 11—11 of Fig. 7.

Like characters of reference designate similar parts in all the views.

Referring to the accompanying drawings, I provide suitable handles 1, to which suitable ferrules 2 are secured by suitable means such as bolts 3. I provide a suitable blade finger 4 and an opposed blade finger 5 of greater length than blade finger 4, so that the latter member may pass through member 5, as illustrated in dotted lines in Fig. 1 to permit of catching and holding an animal of small size. The shank 7 of member 4 and shank 8 of member 5 are secured by a suitable bolt or pivot 6. I may provide bolts having concavo-convex heads 9 as shown in Fig. 4, to secure members 2 to the handles 1.

In the form of invention as particularly illustrated in Figs. 1 and 2 of the drawings, a pair of fingers 4 and 5 coact respectively with the shanks 7 and 8. Each of the fingers 4 and 5 comprises two substantially parallel tines having their outer free end portions in convergence and connected one to the other. With this arrangement it has been fully demonstrated in practice that a hog may be effectively held. The tines of the fingers in the forms of the invention as illustrated particularly in Figs. 1 and 2 and Figs. 7 and 8 have their inner end portions of a greater width than their outer or connected end portions as is clearly indicated by Figs. 5 and 6 and 9 and 10 respectively.

When operated, the instrument is opened as shown in Fig. 1, members 4 and 5 are placed over the back of the animal and the handles are closed until the members 4 and 5 press the sides of the animal with sufficient pressure to hold it. The handles of the instrument may then be tilted sidewise upon the ground or floor, thus laying the animal on its side where it is held fast until ready to be released. In the case of an animal of small size members 4 and 5 overlap each other as shown in dotted lines in Fig. 1.

What I claim is:

1. A device of the character described comprising two shanks in crossed relation and pivotally engaged one to the other and a pair of transversely spaced fingers carried by the outer ends of each of the shanks, each of said fingers comprising parallel tines having their outer end portions in convergence and connected one to the other, one pair of fingers being of a length greater than that of the second pair and both pairs of fingers being outwardly bowed.

2. A device of the character described comprising a pair of crossed shanks pivotally engaged one with the other and a finger carried by the outer end portion of each of the shanks, each of said fingers comprising a pair of parallel tines having their outer end portions in convergence and connected one to the other, each of said fingers being outwardly bowed, and one of said fingers being of a length greater than that of the second finger.

THOMAS J. DAWSON.

Copies of this patent may be obtained for five cents each, by addressing the "Commissioner of Patents, Washington, D. C."